June 18, 1963  J. H. MILLER ETAL  3,094,174
SOIL AGITATOR
Filed Aug. 31, 1959
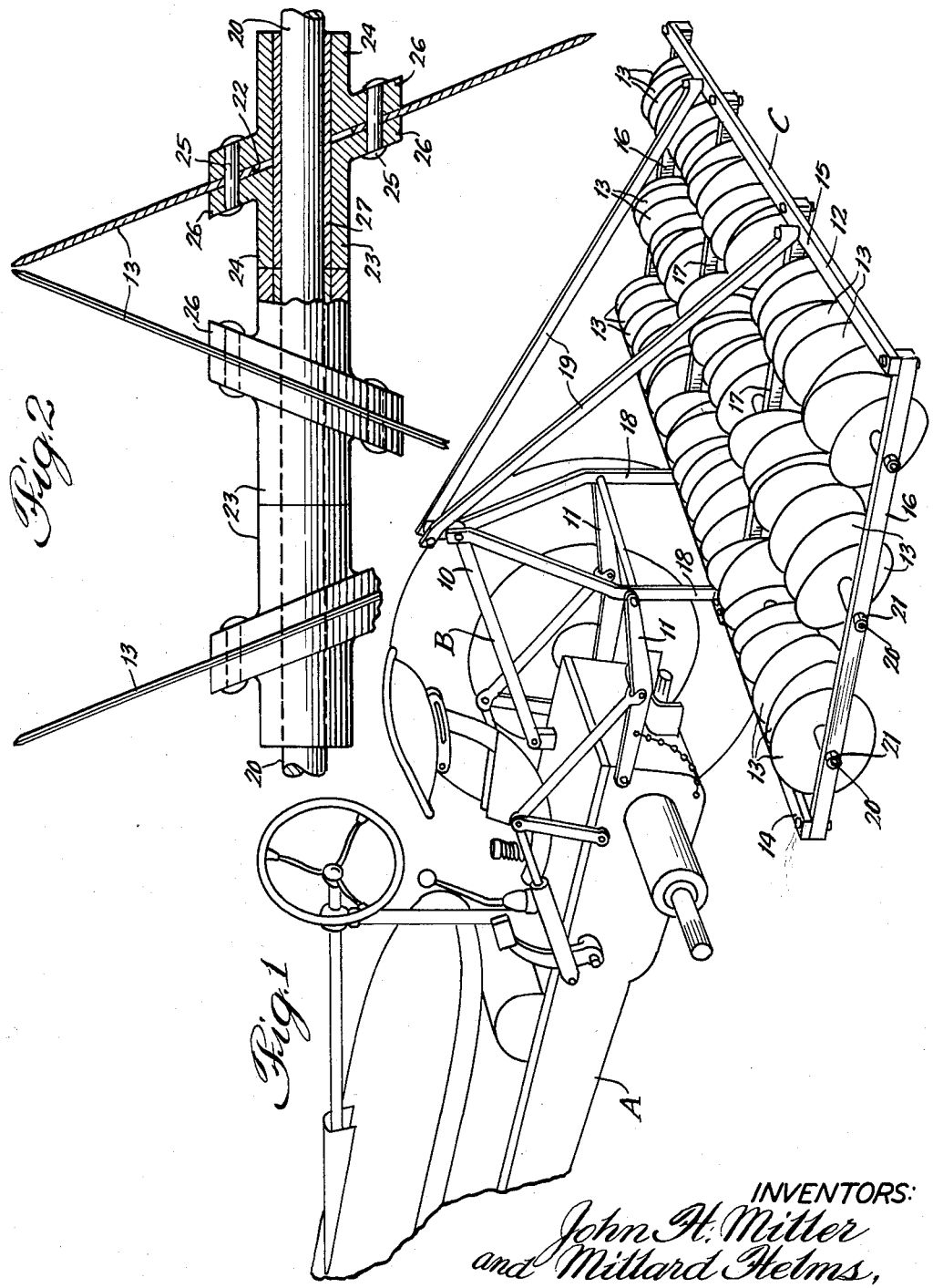
INVENTORS:
John H. Miller
and Millard Helms,
BY Edward Tilton, Fallon + Lungmus,
ATTORNEYS.

United States Patent Office 3,094,174
Patented June 18, 1963

3,094,174
SOIL AGITATOR
John H. Miller, La Grange, Mo. (6411 N. 52nd Place, Scottsdale, Ariz.), and Millard O. Helms, Ewing, Mo. (Palmyra, Mo.)
Filed Aug. 31, 1959, Ser. No. 836,956
8 Claims. (Cl. 172—531)

This invention relates to a soil agitator, and more specifically, to an agricultural machine particularly adapted for preparing soil for planting or for mixing fertilizer, lime or seed with the soil.

Ordinarily, fields are prepared for planting by first plowing, then drawing a disk agitator over the soil to break up clods and turn the soil, and thereafter levelling the soil by means of a harrow. Therefore, the preparation of the soil for planting is usually a three step operation, each step being performed successively rather than simultaneously.

While efforts have been made to combine these several operations so that they may be performed simultaneously in a single trip over a field, such efforts have been generally unsuccessful because of the structural and operational characteristics of the devices. For example, it is not feasible to pull both a plow and disk in tandem behind a single tractor for a variety of reasons. A disk, with its dished blades fixed to angularly disposed shafts, requires a central hitch and, in order to provide such a hitch without interfering with plow operation, it becomes necessary to provide connecting means for the disk which bridges the plow. Even if a practical bridging hitch was developed, the combined weight and resistance of the plow and disk would well exceed the pulling capabilities of conventional farm tractors. Furthermore, since the width of a disk is substantially greater than that of a plow, the lateral portions of the disk would cut into unplowed soil and, aside from the lack of value in such an operation, would further increase the load upon the tractor.

There are, in addition, other disadvantages inherent in the usual procedures for preparing soil for planting. For instance, large clods sometimes remain after a disking operation and a harrow, intended primarily as a soil levelling device, is often ineffective in breaking up such clods. To fertilize such soil effectively and uniformly, it is often necessary to use a liquid fertilizer rather than the less expensive dry fertilizers such as the commercial fertilizers in pelletized or granulated form.

Accordingly, it is a principal object of the present invention to provide an agitator which overcomes the aforementioned defects and disadvantages arising from the use of conventional equipment. Specifically, it is an object of this invention to provide a soil agitator which may be used in place of both the disk structures and harrows in common use and which in a single operation thoroughly agitates, mulches and distributes the top soil to prepare a seedbed more quickly and effectively than conventional equipment. Thus, the invention is concerned with an implement that replaces the disk and harrow for seedbed preparation on plowed ground to speed soil preparation and reduce labor, time and fuel costs. Another important object is to provide an agitator which replaces both the harrow and the disk and which may be hitched in tandem behind a plow without interfering with plow operation and without requiring further operations in preparing the soil for planting.

A further object is to provide an agitator of relatively inexpensive construction for seedbed preparation. A still further object is to provide a highly effective agitator which requires for its operation a pulling force substantially less than that required for a disk and which is self-cleaning or non-clogging in operation.

Other objects will appear from the specification and drawings in which:

FIGURE 1 is a fragmentary perspective view illustrating a structure embodying the present invention in conjunction with a conventional farm tractor; and FIGURE 2 is an enlarged broken plan view taken partly in section and showing the mounting of the agitator blades upon a shaft.

Referring to the drawings the letter A generally designates a conventional farm tractor equipped with a lift and attachment assembly B to which is secured the soil agitator C of the present invention. Assembly B includes a pivotal guide arm 10 and a pair of hydraulically actuated lift arms 11, all of which are pivotally connected to the tractor for movement between raised positions and the lowered positions illustrated in FIGURE 1. Since the tractor A and lift assembly B are entirely conventional, a further description of this structure is believed unnecessary herein.

The agitator C essentially comprises a horizontal frame 12 equipped with a plurality of rows of disks 13, each row extending transversely with reference to the direction of movement of the structure when it is being drawn by a tractor. In the illustration given, there are three rows of disks although it is to be understood that a greater or smaller number may be provided depending upon the specific use of the agitator and the soil conditions encountered.

As shown in FIG. 1, the frame 12 is rectangular in shape, having front, rear and side frame members 14, 15 and 16, respectively. In addition, the frame is provided with one or more intermediate members 17 disposed between and parallel with the side frame members to increase the structural rigidity of the unit.

The frame may be coupled to the attachment assembly of a tractor by any suitable means. In the illustration given, we provide the front frame member 14 with a pair of upstanding and converging bars 18 which are pivotally secured to arms 10 and 11 of the lift assembly B. A pair of downwardly and outwardly inclined braces 19 connect the rear frame member 15 to arm 10 adjacent its point of attachment to the upper ends of bars 18 so that when the arms of the hydraulic lift assembly pivot upwardly, the entire agitator C is lifted from the ground. It is to be understood, however, that while we have shown the agitator connected directly to a tractor for purposes of illustration, it is preferable in many cases to interpose another implement between the tractor and the agitator, as will be brought out more fully as the specification proceeds.

An important aspect of the present invention lies in the discovery that where an agitator is provided with a plurality of angled disks or circular blades which are mounted for independent relative rotation upon horizontal shafts extending at right angles to the direction of agitator movement, such a structure is exceedingly effective in breaking up clods and in preparing soil for planting. The independent or free rotation of each disk results in displacement of soil without the formation of furrows and thus tends to reduce the possibility of erosion. Furthermore, the free and random rotation of each disk causes the agitator to operate without clogging and without vibration or side draft. Consequently, for a unit comparable in size to a conventional disk or harrow, the pulling power required for operation of the present structure is relatively small.

Each row of disks or blades 13 is carried by a transverse shaft 20 which extends from one side of the frame to the other and which is secured at its ends by nuts 21 to the side frame members 16. The blades are formed from flat sheet stock and are circular in shape with sharpened peripheral edges, although it is to be understood that serrated or toothed edges may be provided where soil conditions are such that uneven or irregular edges prove more effective in breaking up colds. Each blade has an enlarged central opening 22 of a diameter substantially greater than the diameter of shaft 20 and is mounted upon the shaft for independent relative rotation by means of a hub assembly 23.

Each hub assembly is composed essentially of a pair of axially extending hub elements 24 disposed on each side of a blade and secured to the blade by means of bolts or rivets 25 extending through the blade and through the flange portions 26 of each element. As shown clearly in FIGURE 2, each blade is mounted at an oblique angle with reference to the shaft 20, the angle being the same or substantially the same for all blades mounted on the same shaft. Preferably, this angle falls within the range of 60–70° with reference to the axis of the shaft (an angle of 68° being illustrated in the drawings), although blade angles ranging between 45–80° have been found effective.

It will be noted that the axial length of each hub assembly 23 is slightly greater than the maximum distance (measured axially) between any diametrically opposing points along the edge of the blade 13. Thus, although the hub assemblies of adjacent blades in a single row are disposed in end to end relation, the blades carried thereby will not engage each other as they are independently rotated during operation.

Extending through each hub assembly and rotatably receiving shaft 20 is a bearing sleeve 27 which may, if desired, be formed of any well-known lubricant-retaining or lubricant-impregnated material.

As the agitator C is pulled over the ground by a tractor, each of the circular blades is free to rotate independently upon its shaft and, as it rotates, the periphery thereof will shift or oscillate from side to side to defne an S pattern through the soil. This lateral movement and the constantly changing angular disposition of the portion of the blade which penetrates the soil causes the earth to be thrown laterally in opposite directions. The lateral displacement of the soil and the cutting action of the blades as they move along the ground result in the breaking of clods and the thorough pulverization of the top soil.

While the blades have been described as defining an S path, it is to be understood that the agitator does not produce furrows in the soil. The provision of successive rows of agitator blades as well as the freedom of each blade to rotate independently and at its own speed (or not at all) prevents the formation of furrows. Thus, one blade may rotate faster than an adjacent blade, depending upon the texture and character of the soil through which the respective blades travel.

As already indicated, the free and random rotation of the circular blades allows the agitator to operate without clogging or jamming. A clod which might otherwise become entrapped between the converging portions of adjacent blades is quickly released as the blades continue to rotate at different speeds. Consequently, the agitator is "self-cleaning" and, in addition operates without either vibration or side draft.

An important feature of the present invention lies in the fact that, unlike a disk, the agitator may be pulled in tandem behind a plow so that the soil is turned and prepared for planting in a single operation. Its relatively low resistance to movement because of the independent rotatability of the blades and the orientation of the shafts normal to the direction of travel, in addition to the fact that a central hitch is not required, permit the agitator to be coupled directly to the plow which it follows. Furthermore, the agitator may be used either alone or in tandem behind a fertilizer or lime spreader for the purpose of thoroughly mixing the fertilizer or lime with the soil. In some instances, as where spring disking follows fall plowing, it may be desirable to hitch the agitator behind a conventional disk so that the soil will be prepared for planting in a single trip over the field.

While in the foregoing we have disclosed an embodiment of the present invention in considerable detail for purposes of illustration, it will be understood by those skilled in the art that any of these details may be varied without departing from the spirit and scope of the invention.

We claim:

1. In a soil agitator for preparing plowed soil for planting, the combination comprising a horizontal shaft adapted to extend at right angles to the direction of agitator movement, a plurality of hub assemblies journaled upon said shaft for free independent rotation thereon, and a flat disk carried by each of said hub assemblies for rotation about said shaft, said disks each being mounted upon said hubs at an angle oblique to the axis of said shaft and to the axis of rotation of said disks, whereby, all of said disks are mounted for independent relative rotation upon said shaft.

2. The structure of claim 1 in which said flat disks are generally circular in shape.

3. The structure of claim 1 in which said disks are each mounted at an oblique angle ranging between 45–80° from the horizontal axis of rotation thereof.

4. The structure of claim 1 in which said disks are each mounted at an oblique angle ranging between 60–70° from the horizontal axis of rotation thereof.

5. A soil agitator adapted to be moved over plowed soil to prepare the same for planting comprising a horizontal frame, a series of spaced horizontal shafts mounted upon said frame and extending at right angles to the direction of agitator movement, and a plurality of flat disks rotatably carried by each of said shafts for rotation about the horizontal axes of said shafts, said disks each being disposed at an angle oblique to the shaft supporting the same and to the axis of rotation of said disk, said disks being independently rotatable with reference to each other as said agitator is moved over the soil.

6. The structure of claim 5 in which said disks are generally circular in shape.

7. In a soil agitator adapted for preparing soil for planting, the combination comprising a horizontal shaft adapted to extend transversely to the direction of agitator movement, and a plurality of generally flat and circular blades journaled upon said shaft for rotation about the horizontal axis thereof, each of said blades lying along a plane extending at an oblique angle to said shaft and being independently rotatable with reference to the other of said blades.

8. The structure of claim 7 in which said blades are each mounted upon said shaft at an oblique angle ranging between 45–80° from the horizontal axis thereof.

References Cited in the file of this patent

UNITED STATES PATENTS

| | | |
|---|---|---|
| 344,293 | Tschantz | June 22, 1886 |
| 590,981 | Harper | Oct. 5, 1897 |
| 1,585,839 | Ernst | May 25, 1926 |
| 2,011,671 | Ballentine | Aug. 20, 1935 |
| 2,503,993 | Blomgren | Apr. 11, 1950 |
| 2,560,359 | McCardell | July 10, 1951 |
| 2,575,321 | Traver | Nov. 13, 1951 |
| 2,678,595 | Peters | May 18, 1954 |